US009363439B2

(12) United States Patent
Kawaguchi

(10) Patent No.: US 9,363,439 B2
(45) Date of Patent: Jun. 7, 2016

(54) PHOTOGRAPHING APPARATUS AND OPERATION CONTROL METHOD FOR THE SAME

(71) Applicant: Olympus Corporation, Shibuya-ku, Tokyo (JP)

(72) Inventor: Katsuhisa Kawaguchi, Atsugi (JP)

(73) Assignee: Olympus Corporation, Tokyo (JP)

(*) Notice: Subject to any disclaimer, the term of this patent is extended or adjusted under 35 U.S.C. 154(b) by 152 days.

(21) Appl. No.: 13/760,759

(22) Filed: Feb. 6, 2013

(65) Prior Publication Data

US 2014/0049677 A1 Feb. 20, 2014

(30) Foreign Application Priority Data

Feb. 7, 2012 (JP) .................................. 2012-024469

(51) Int. Cl.
H04N 5/232 (2006.01)
(52) U.S. Cl.
CPC ....... *H04N 5/23293* (2013.01); *H04N 5/23216* (2013.01)
(58) Field of Classification Search
CPC ........... H04N 5/23293; H04N 5/23216; G06F 3/0488
USPC ........ 348/207.99, 211.4, 211.5, 211.6, 211.7, 348/211.8, 211.9, 211.11, 211.12, 211.13, 348/211.14, 333.01, 333.02, 333.03, 348/333.04, 333.05, 3, 33.08, 333.09, 348/333.11, 333.12
See application file for complete search history.

(56) References Cited

U.S. PATENT DOCUMENTS

| 7,561,201 | B2 | 7/2009 | Hong | |
|---|---|---|---|---|
| 8,136,052 | B2* | 3/2012 | Shin | G06F 3/04883 715/835 |
| 8,605,188 | B2* | 12/2013 | Ishihara | G03B 3/10 348/333.01 |
| 2006/0072028 | A1* | 4/2006 | Hong | H04N 5/23216 348/333.01 |
| 2007/0273663 | A1* | 11/2007 | Park | G06F 3/04883 345/173 |

(Continued)

FOREIGN PATENT DOCUMENTS

| CN | 175595 A | 4/2006 |
|---|---|---|
| JP | 2004-165934 | 6/2004 |

(Continued)

OTHER PUBLICATIONS

Office Action to Chinese Patent Application No. 201310045589.2, mailed on Aug. 5, 2015 (9 pgs.).

(Continued)

*Primary Examiner* — Twyler Haskins
*Assistant Examiner* — Peter Chon
(74) *Attorney, Agent, or Firm* — John C. Pokotylo; Straub & Pokotylo

(57) ABSTRACT

A photographing apparatus includes: an image pickup section picking up an object image to acquire a picked-up image; a display section capable of showing a display based on the picked-up image; a touch panel generating a signal corresponding to a predetermined operation; and a control section detecting a direction of a slide operation on the touch panel and performing control to select one of multiple items displayed on the display section on the basis of the direction of the slide operation; and the control section sets a display position of each of the multiple items to correspond to an operation direction for selecting the item on a one to one basis and selects one of the multiple items corresponding to the direction of the slide operation in the selection.

11 Claims, 11 Drawing Sheets

(56) References Cited

U.S. PATENT DOCUMENTS

2011/0267526 A1  11/2011  Ishihara et al.
2014/0049677 A1* 2/2014  Kawaguchi .............. 348/333.01

FOREIGN PATENT DOCUMENTS

| | | |
|---|---|---|
| JP | 2008-508601 | 3/2008 |
| JP | 2010-263425 | 11/2010 |
| JP | 2011-028345 | 2/2011 |
| WO | WO 2006/020305 | 2/2006 |

OTHER PUBLICATIONS

Office Action to Japanese Application No. 2012-024469, mailed on Oct. 20, 2015 (4 pgs.).

* cited by examiner

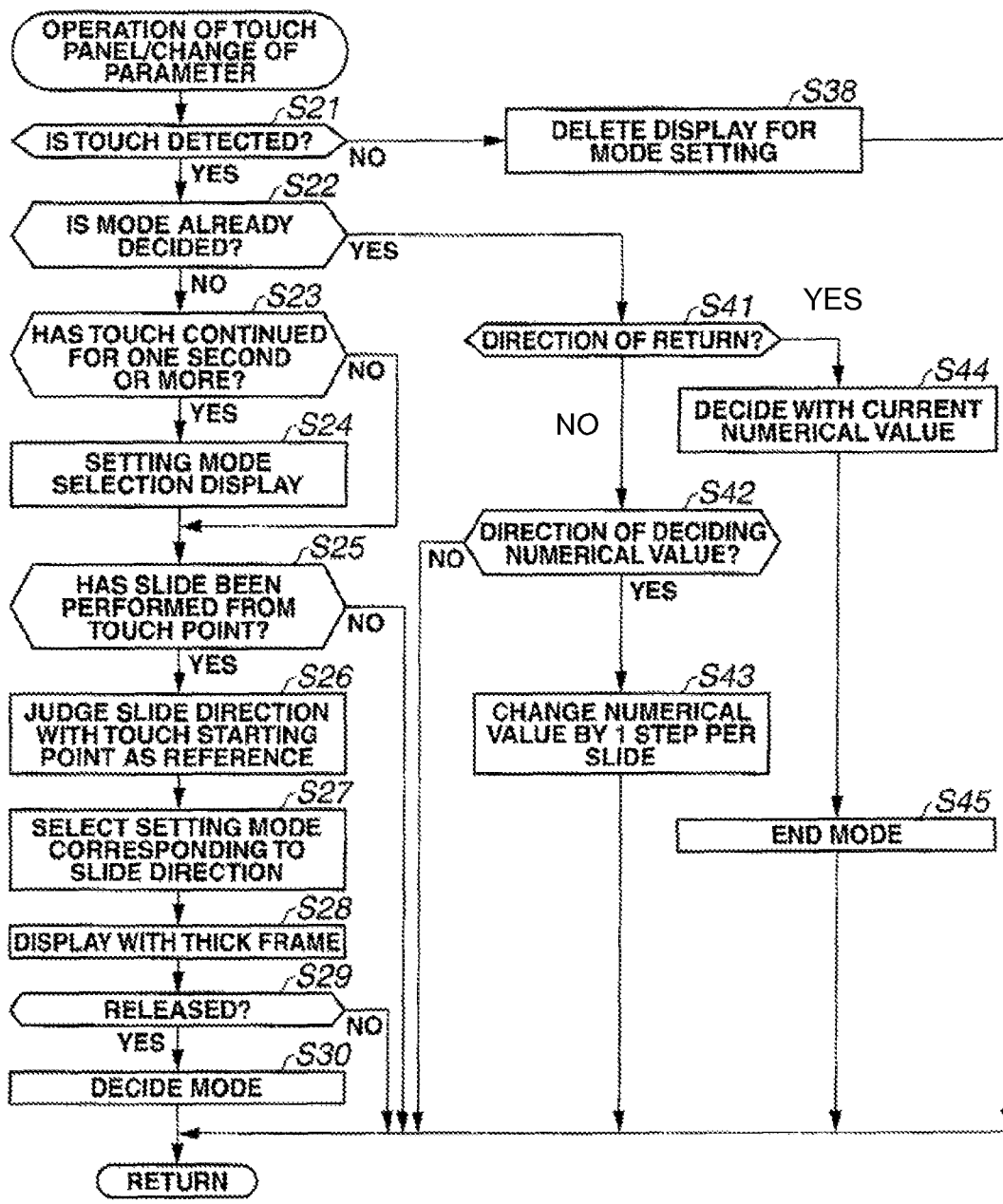

PHOTOGRAPHING APPARATUS AND OPERATION CONTROL METHOD FOR THE SAME

This application claims benefit of Japanese Application No. 2012-24469 filed in Japan on Feb. 7, 2012, the contents of which are incorporated by this reference.

BACKGROUND OF THE INVENTION

1. Field of the Invention

The present invention relates to a photographing apparatus having a touch-operable display panel and an operation control method therefor.

2. Description of the Related Art

Recently, mobile apparatuses equipped with a photographing function (photographing apparatuses), such as a digital camera, have spread. Some photographing apparatuses of this kind are provided with a display panel configured by an LCD or the like and an electronic viewfinder. The electronic viewfinder is provided with a small-size LCD panel for displaying a picked-up image and an eye piece section. A user can confirm the picked-up image by observing the LCD panel from the eye piece section. The display panel is provided, for example, on the back surface of the photographing apparatus and is capable of performing display similar to display by the electronic viewfinder.

It is also possible to display not only a picked-up image but also various menu displays and the like for controlling setting of the photographing apparatus and a photographing operation, on the electronic viewfinder and the display panel. Furthermore, a touch panel may be arranged as the display panel, and the user can perform a setting operation, a photographing operation and the like by touching a display position corresponding to a menu display or the like on the display panel and the like with a finger.

Note that, as the touch panel, a technique has been also developed in which touches at two or more points are detected to enable an intuitive operation (for example, Japanese Patent Application Laid-Open Publication No. 2008-508601).

SUMMARY OF THE INVENTION

A photographing apparatus according to an aspect of the present invention includes: an image pickup section picking up an object image to acquire a picked-up image; a display section capable of showing a display based on the picked-up image; a touch panel generating a signal corresponding to a predetermined operation; and a control section detecting a direction of a slide operation on the touch panel and performing control to select one of multiple items displayed on the display section on the basis of the direction of the slide operation; and the control section sets a display position of each of the multiple items to correspond to an operation direction for selecting the item on a one to one basis and selects one of the multiple items corresponding to the direction of the slide operation in the selection.

An operation control method for a photographing apparatus according to an aspect of the present invention is an operation control method for a photographing apparatus, the photographing apparatus including: an image pickup section picking up an object image to acquire a picked-up image, a display section capable of showing a display based on the picked-up image, a touch panel generating a signal corresponding to a predetermined operation, and a control section; and the control section sets a display position of each of the multiple items displayed on the display section to correspond to an operation direction for selecting the item on a one to one basis, detects a direction of a slide operation on the touch panel, and selects, on the basis of the detected slide operation direction, one of the multiple items corresponding to the slide operation direction.

The above and other objects, features and advantages of the invention will become more clearly understood from the following description referring to the accompanying drawings.

BRIEF DESCRIPTION OF THE DRAWINGS

FIG. 6 is a flowchart showing an operation flow adopted in a second embodiment of the present invention;

DETAILED DESCRIPTION OF THE PREFERRED EMBODIMENTS

Embodiments of the present invention will be described below in detail with reference to drawings.

(First Embodiment)

Figure 1:
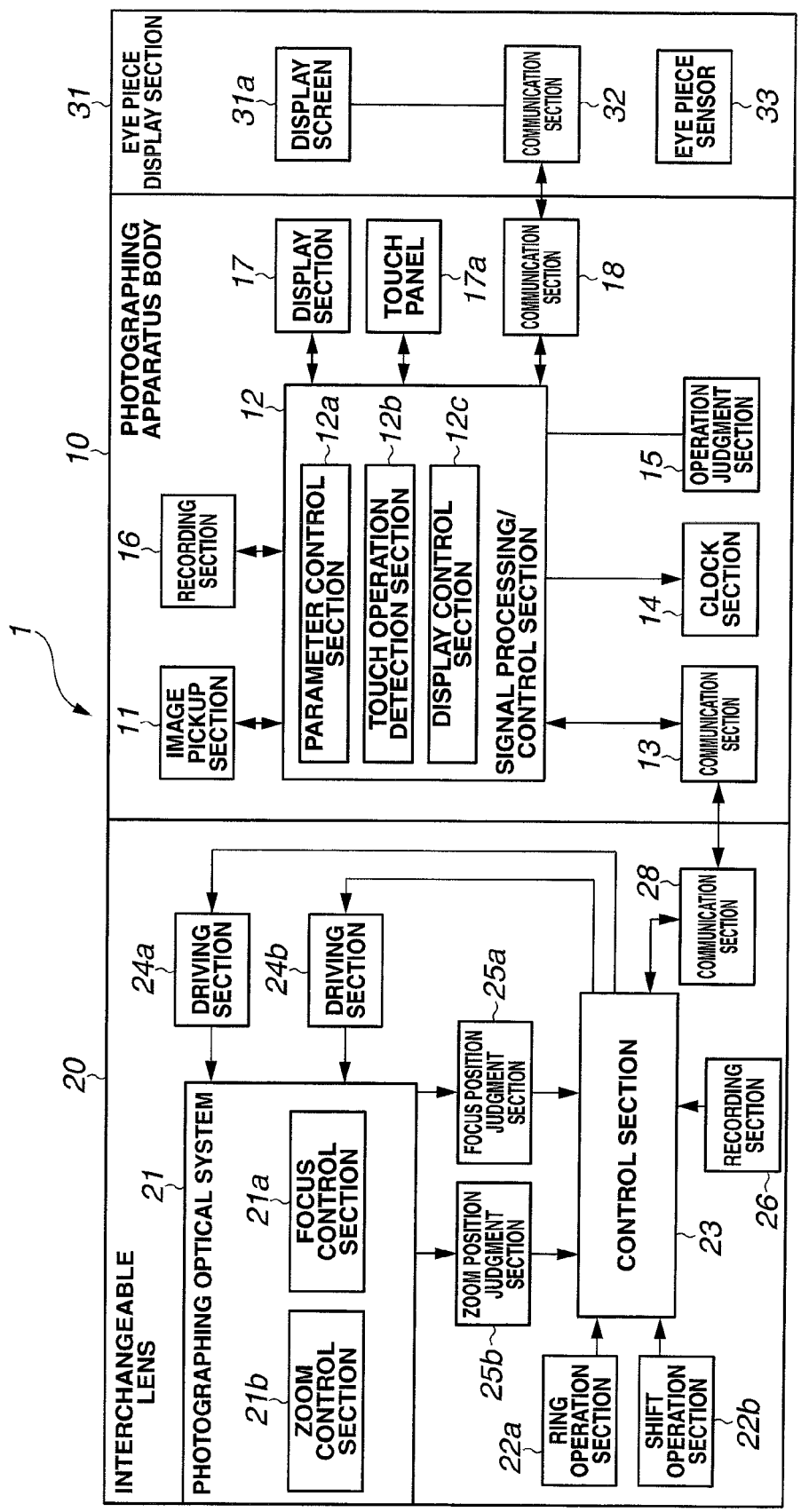
FIG. 1 is a block diagram showing a circuit configuration of a photographing apparatus according to a first embodiment of the present invention.

FIG. 1 is a block diagram showing a circuit configuration of a photographing apparatus according to a first embodiment of the present invention.

First, an operation method in the present embodiment will be described with reference to FIGS. 2A to 2D and FIGS. 3A to 3D. FIGS. 2A to 2D are diagrams for illustrating an operation for displaying a menu screen, and FIGS. 3A to 3D are diagrams for illustrating an operation for setting a parameter.

Figure 2A:
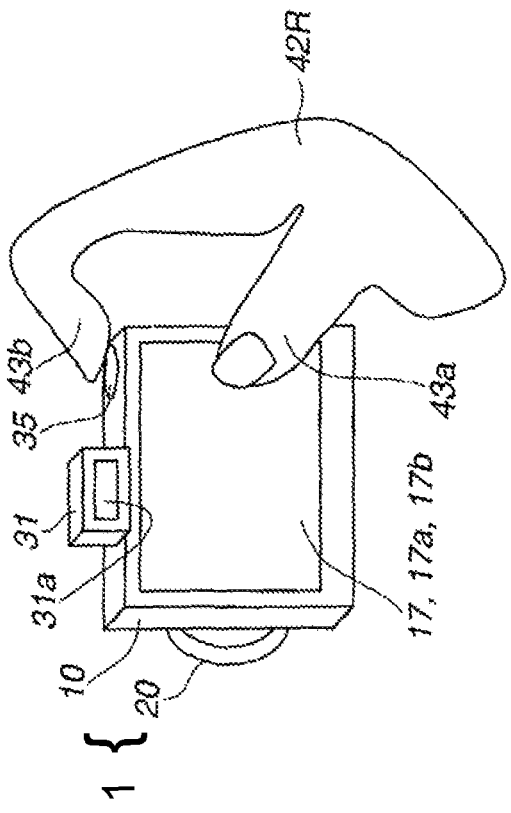
FIGS. 2A to 2D are diagrams for illustrating an operation for displaying a menu screen.
Figure 2C:
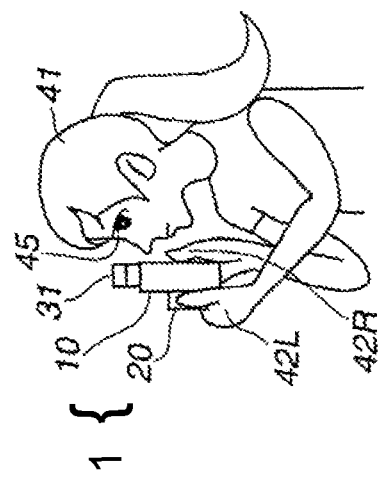
Figure 2B:
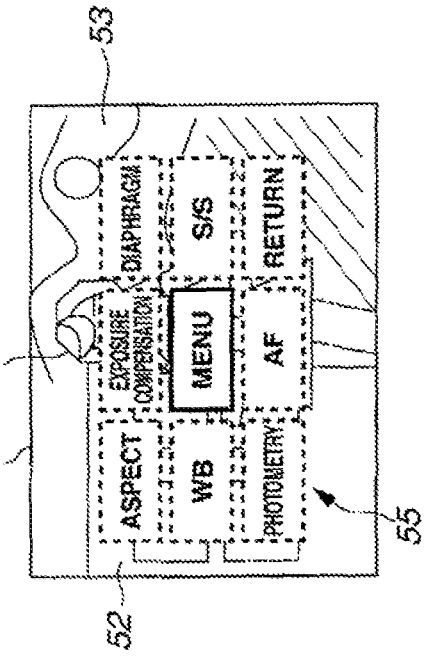

As shown in FIGS. 2A and 2B, a photographing apparatus 1 in the present embodiment is attached with an eye piece display section 31 (first display section), such as an electronic viewfinder, at the top surface of a photographing apparatus body 10 and is provided with a display section 17 (second display section) configured by an LCD or the like on the back surface. The eye piece display section 31 may have a structure of being attachable to and detachable from the photographing apparatus 1 or may be fixed to the photographing apparatus 1. For example, a user 41 performs photographing, supporting the photographing apparatus 1 with a left hand 42L and holding the photographing apparatus body 10 with a right hand 42R, in a state of being able to operate an interchangeable lens 20 arranged at the front of the photographing apparatus body 10. A shutter button 35 is arranged on the right side on the top surface of the photographing apparatus body 10, and the user 41 performs photographing by pressing the shutter button 35 with a forefinger 43b of the right hand 42R.

A live view display of a picked-up image picked up by an image pickup section 11 to be described later can be displayed on both of a display screen 31a of the eye piece display section 31 and a display screen 17b of the display section 17. The eye piece display section 31 has an eyepiece (not shown), and the user can observe a live-view-displayed object image via the eyepiece. The way of photographing in which a live view display is confirmed by putting an eye close to the eye piece display section 31 makes it possible to hold a camera stably, perform framing easily and reduce movement of hands at the time of photographing at a long focal length. Furthermore, since the display screen of the eye piece display section 31 is not influenced by sunlight, an object can be observed in a state of being easy to see and in a state of superior color reproducibility, Therefore, it is often more advantageous for photographing to be performed while putting an eye close to the eye piece display section 31 and seeing a live view display than in the case of performing photographing while seeing a live view display displayed on the display section 17. At the time of photographing, photographing parameters and the like may be changed while observing a live view display. If the photographing parameters can be changed in a state of keeping the eye close to the eye piece display section 31, that is, without seeing the display screen 17b of the display section 17, photographing can be performed smoothly.

FIG. 2A shows an example of photographing in such a state of keeping the eye close to the eye piece display section 31. The user 41 performs photographing in a state of holding the photographing apparatus body 10 horizontally and keeping one eye 45 facing a part of the eye piece display section 31 to be brought close to the eye. When the photographing apparatus 1 is powered on, a live view display is displayed on the display screen 31a of the eye piece display section 31 on the basis of a picked-up image from the image pickup section 11 to be described later at the time of a photographing mode. FIG. 2C shows the live view display.

In the example of FIG. 2C, the live-view display displayed on the display screen 31a of the eye piece display section 31 shows that a picked-up image includes an image of a building 52 on the left side, an image of a scene 53 on the right side, and an image of a person 54 in the center. When the user 41 performs an operation of pressing the shutter button 35 in this state, an image of the live-view-displayed object is picked up and recorded. Note that the live view display displayed on the eye piece display section 31 may be displayed on the display screen of the display section 17 at the same time.

Now, it is assumed that the user performs an operation for specifying a photographing parameter setting mode. In the present embodiment, the photographing apparatus 1 is adapted to display a setting mode selection display by touching a touch panel 17a arranged on the display section 17. In this case, in the present embodiment, a position to be touched by the user 41 may be any position on the display screen 17b of the display section 17. Therefore, the user 41 does not have to confirm the position to touch by looking at the display screen 17b. For example, by touching an appropriate position on the display screen 17b of the display section 17 with a thumb 43a or the like in a state of looking in the display screen 31a in the eye piece display section 31, the user 41 can proceed to the photographing parameter setting mode (FIG. 2B).

Figure 2D:
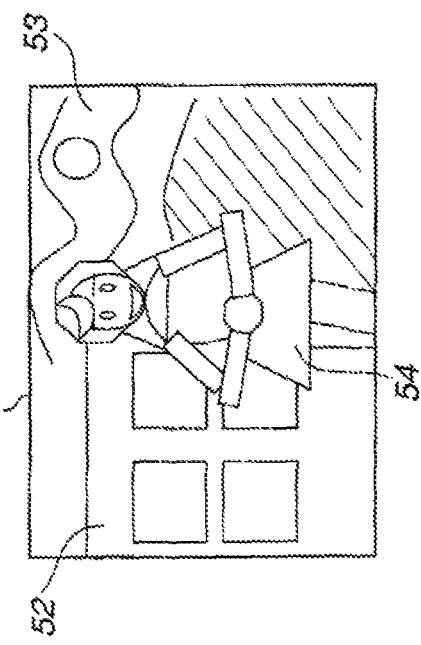

FIG. 2D shows an example of the setting mode selection display. A setting mode selection display 55 is displayed on the display screen 31a of the eye piece display section 31. In the example of FIG. 2D, the setting mode selection display 55 has an "ASPECT" display for proceeding an aspect ratio setting mode, an "EXPOSURE COMPENSATION" display for proceeding to an exposure compensation setting mode, a "DIAPHRAGM" display for proceeding to a diaphragm setting mode, a "WB" display for proceeding to a white balance setting, an "S/S" display for proceeding to a shutter speed setting mode, a "PHOTOMETRY" display for proceeding to a photometry setting mode, an "AF" display for proceeding to a focus control setting mode and a "RETURN" display for causing the setting mode selection display 55 to end, in addition to a "MENU" display indicating a menu for current selection.

Though the setting mode selection display 55 is displayed on the display screen 31a of the eye piece display section 31, the setting mode selection display 55 can be also displayed on the display screen 17b of the display section 17. The position of each display in the setting mode selection display 55 indicates a direction of a slide operation for a user to select a mode. For example, since the "DIAPHRAGM" display is positioned in an obliquely right upward direction when the "MENU" display is assumed as a reference, the "DIAPHRAGM" display indicates that the diaphragm setting mode is selected by the user sliding a finger toward the obliquely right upward direction on the display screen 17b of the display section 17.

Figure 3A:
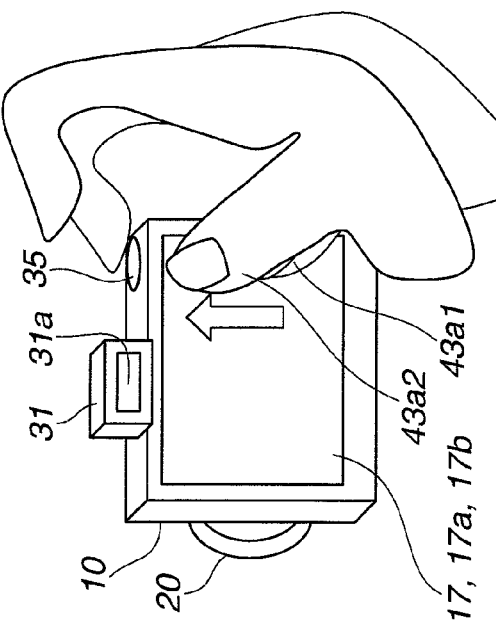
FIGS. 3A to 3D are diagrams for illustrating an operation for setting a parameter.

In the present embodiment, a slide operation by the user has a meaning only with regard to its slide direction. The starting point of the slide may be any point. For example, FIG. 3A shows that the user's thumb has been slid from a thumb 43a1 at a starting point position to a thumb 43a2 at an ending point position on the display screen 17b of the display section 17 in a straight upward direction indicated by an arrow.

A slide direction is judged from the positions of the starting and ending points of the user's slide operation, and a setting mode corresponding to a result of the slide direction judgment result is selected. In the example of FIG. 3A, the starting point position of the user's thumb almost corresponds to the "S/S" display, and the ending point position corresponds to the "DIAPHRAGM" display. However, since the user has slid the finger in the almost straight upward direction, the photographing apparatus 1 judges that an operation of selecting the exposure compensation setting mode corresponding to the "EXPOSURE COMPENSATION" display positioned right above the "MENU" display has been performed.

Figure 3B:
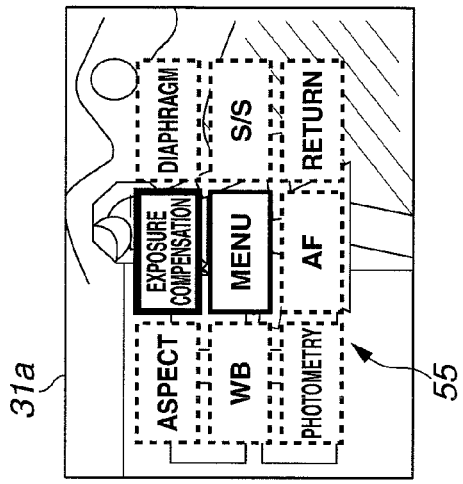

Note that, even while the user is sliding the finger, the photographing apparatus 1 judges the slide direction of the finger and sequentially displays judgment results. For example, in the example of FIG. 3A, a display showing that the "EXPOSURE COMPENSATION" display corresponding to the slide direction, the straight upward direction, is going to be selected is displayed until the user releases the finger and ends the mode selection operation (FIG. 3B). In FIG. 3B, the mode the user is going to select is indicated by making the frame of the "EXPOSURE COMPENSATION" display thick. However, the mode may be indicated by changing the color, shade or the like.

Figure 3C:
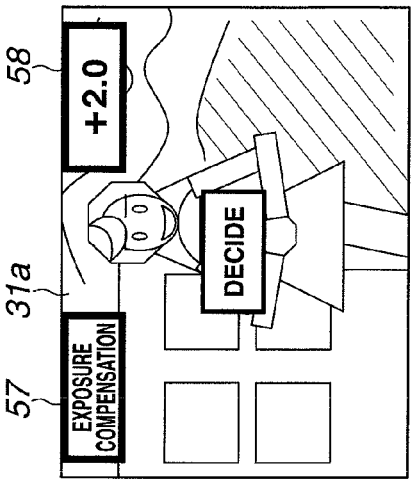

In the present embodiment, when a setting mode is selected, a parameter selection display 56 for setting a parameter is displayed for the selected setting mode. FIG. 3C shows an example of the parameter selection display 56. The parameter selection display 56 is displayed on the display screen 31a of the eye piece display section 31. In the example of FIG. 3C, the parameter selection display 56 for exposure compensation is shown. The parameter selection display 56 has a "DECISION" display for deciding a selected parameter, and each parameter display for changing a parameter between +2.0 and −2.0 by an increment of 0.5.

As for the parameter selection display 56 also, though it is displayed on the display screen 31a of the eye piece display section 31, it can be also displayed on the display screen 17b of the display section 17. The position of each display in the parameter selection display 56 indicates a direction of a slide operation for a user to select a parameter. For example, since a "+1.0" parameter display is positioned in an obliquely right upward direction when the "DECISION" display is assumed as a reference, an amount of change in parameter for increasing the parameter by +1.0 can be selected by the user sliding a finger toward the obliquely right upward direction on the display screen 17b of the display section 17.

In this case also, the slide operation by the user has a meaning only with regard to its slide direction. The starting point of the slide may be any point. For example, if the user slides the thumb in an obliquely left upward direction on the screen of the display section 17, the direction of the user's slide operation is judged to be the obliquely left upward direction irrespective of positions of the starting and ending points of the slide operation, and an amount of change in parameter of +2.0 corresponding to the judgment result of the slide direction is selected. Note that, in this case also, the photographing apparatus 1 may judge a slide direction of the finger while the user is sliding the finger and sequentially display judgment results.

Figure 3D:
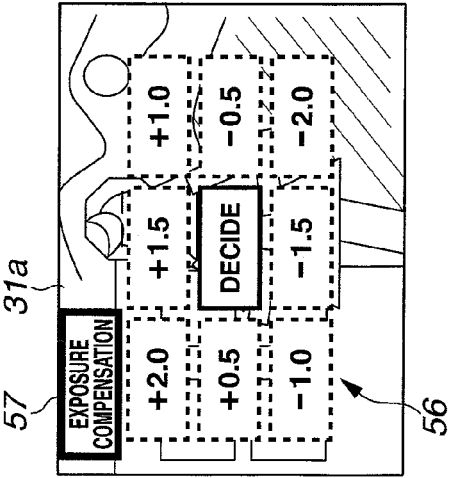

FIG. 3D shows the above example. On the display screen 31a of the eye piece display section 31, a display 57 showing that an exposure compensation mode is selected and a selection parameter display 58 showing that a selected amount of change in parameter is +2.0 are shown on a view display. By the user performing an operation of deciding the selected parameter, for example, an operation of touching the display screen 17b of the display section 17 in this state, the amount of compensation for exposure compensation is decided as +2.0.

The above description is summarized as below.

Multiple selectable "items" related to a predetermined "upper-level item" are individually displayed around a reference position. The multiple "items" are information related to the predetermined "upper-level item" and belong to (are included in) the "upper-level item". In FIG. 2D, "MENU" corresponds to the "upper-level item", and "EXPOSURE COMPENSATION", "ASPECT", "WB", "PHOTOMETRY", "AF", "RETURN", "S/S" and "DIAPHRAGM" correspond to the "items". FIG. 2D merely shows an example of the "upper-level item" and the "items". The photographing apparatus has various photographing modes. Therefore, it is possible to set "PHOTOGRAPHING MODE" as the "upper-level item" and cause selectable photographing modes (PERSON PHOTOGRAPHING MODE, SCENE PHOTOGRAPHING MODE, NIGHT VIEW PHOTOGRAPHING MODE, MACRO PHOTOGRAPHING MODE and the like) to correspond to the "items". It is also possible to set a parameter related to an operation of the photographing apparatus as the "upper-level item" and cause values set for the parameter to correspond to the "items". As described later, in the case of regarding "EXPOSURE COMPENSATION" as the "upper-level item", the values of the amount of compensation, "+1.5", "+2.0", "+0.5", "−0.1", "−1.5", "−2.0", "−0.5" and "+1.5" correspond to the "items" (see FIG. 3C).

In FIG. 2D, the characters "MENU" indicating the "upper-level item" is displayed at a predetermined position on the display screen, and the characters "EXPOSURE COMPENSATION", "ASPECT", "WB", . . . indicating the "items" are displayed around the reference position. The form of displaying the "upper-level item" and the "items" is not necessarily limited to characters. Any display form (reduced-image icon, mark icon, symbol icon or the like) may be used if the display form is such that the meanings of the "upper-level item" and the "items" can be understood therefrom.

In FIG. 2D, the characters indicating the "items" are displayed being arranged to be included in a rectangular shape. The shape is not limited to a rectangle, and other shapes (polygon, triangle, circle, ellipse, semicircle and the like) may be selected. For the characters indicating "item", a direction is set with an almost central position of the shape as a reference. For example, the direction can be defined as follows. With a direction from "MENU" to "EXPOSURE COMPENSATION" set as a reference direction (angle 0), the angle of each of the "items" is measured. The definition of angle (direction) is similarly applied to a slide operation on the touch panel. When the angle of each of the "items" is measured counterclockwise, +45.degree. corresponds to "ASPECT", . . . , and +270.degree. corresponds to "DIAPHRAGM". By causing the angle (direction) to correspond to each of the "items" in advance, an "item" to be selected can be identified (distinguished) from an operation angle (operation direction) of a slide operation. One "item" is selected from the multiple "items" only by an operation angle (operation direction) determined from a locus connecting a starting position (starting point) and ending position (ending point) of a slide operation.

In FIG. 1, the photographing apparatus body 10 constituting the photographing apparatus 1 has the image pickup section 11 configured by an image pickup device such as a CCD and a CMOS. The image pickup section 11 performs photoelectric conversion of an object image from the interchangeable lens 20 provided at the front of the photographing apparatus body 10 to obtain a photographed image signal.

The interchangeable lens 20 has a photographing optical system 21 which leads the object image to the image pickup section 11 of the photographing apparatus body 10. The photographing optical system 21 is provided with lenses and the like for zooming and focusing and is provided with a ring operation section 22a and a shift operation section 22b (hereinafter, these will be also referred to as an operation section 22) for performing drive control of the lenses. By operating the ring operation section 22a and the shift operation section 22b configured by a zoom ring, a focus ring and the like, it is possible to adjust not only focus but also a zoom position and the diaphragm.

The ring operation section 22a and the shift operation section 22b output an operation signal based on a user operation to a control section 23. The control section 23 is configured by a microcomputer or the like. The control section 23 generates a focus signal and a zoom signal based on a rotation operation and a shift operation, on the basis of operation signals from the ring operation section 22a and the shift operation section 22b to control driving sections 24a and 24b.

The driving sections 24a and 24b configured by motors or the like drive lenses related to focusing (hereinafter, these will be generically referred to as a focus lens) and lenses related to zooming (hereinafter, these will be generically referred to as a zoom lens) which are provided for the photographing optical system 21 to perform focus control and zoom control. The photographing optical system 21 is provided with a focus control section 21a and a zoom control section 21b. The focus control section 21a outputs a signal corresponding to a position of the focus lens to a focus position judgment section 25a. The zoom control section 21b outputs a signal corresponding to a position of the zoom lens (a zoom position) to a zoom position judgment section 25b.

The focus position judgment section 25a judges a focus position on the basis of the output of the focus control section 21*a* and outputs a judgment result to the control section 23. The zoom position judgment section 25*b* judges a zoom position on the basis of the output of the zoom control section 21*b* and outputs a judgment result to the control section 23. The control section 23 is given the judgment results of the focus position and zoom position and controls the driving sections 24*a* and 24*b* so that a focus position and zoom position corresponding to an operation of the operation section 22 are obtained.

The interchangeable lens 20 is provided with a communication section 28. The photographing apparatus body 10 is provided with a communication section 13. The communication section 28 performs transmission and reception of information to and from the communication section 13 of the photographing apparatus body 10 via a predetermined transmission line. When communication with the communication section 13 of the photographing apparatus body 10 is established, the control section 23 can cause lens information and zoom information about a zoom operation stored in a recording section 26 to be transmitted to the photographing apparatus body 10 by the communication sections 28 and 13.

From the lens information, the photographing apparatus body 10 can recognize which zoom function the interchangeable lens 20 has, and the focal length range (magnification), focal length, brightness number and the like of the zoom lens. The photographing apparatus body 10 is also given information about a rotation operation from the ring operation section 22*a*. The control section 23 is configured so as to be provided with a control signal from a signal processing/control section 12 of the photographing apparatus body 10 via the communication sections 13 and 28 and controlled by the signal processing/control section 12.

Note that, in the present embodiment, various interchangeable lenses can be adopted. Furthermore, not only the interchangeable lenses but also uninterchangeable lenses may be adopted.

The image pickup section 11 of the photographing apparatus body 10 is drive-controlled by the signal processing/control section 12 to photograph an object via the interchangeable lens 20 and outputs a photographed image. The signal processing/control section 12 outputs an image pickup device driving signal to the image pickup section 11 as well as reads the photographed image from the image pickup section 11. The signal processing/control section 12 performs predetermined signal processing, for example, color adjustment processing, matrix conversion processing, noise removal processing and other various signal processing for the photographed image which has been read.

A clock section 14 and an operation judgment section 15 are also arranged in the photographing apparatus body 10. The clock section 14 generates time information to be used by the signal processing/control section 12. The operation judgment section 15 is adapted to generate an operation signal based on a user operation of the shutter button 35 or various switches not shown, such as for setting a photograph mode, which are provided on the photographing apparatus body 10 and outputs the operation signal to the signal processing/control section 12. The signal processing/control section 12 controls each section on the basis of the operation signal.

A recording section 16 is constituted by a nonvolatile memory, a work memory and a memory card. The nonvolatile memory stores a program code to be executed by a CPU included in the signal processing/control section 12, control parameters related to operations of the photographing apparatus and the like. The signal processing/control section 12 stores a photographed image of an object image acquired from the image pickup section 11 into the work memory and performs predetermined signal processing using the work memory. The photographed image which has been compression-processed by the processing can be converted to a predetermined image file and recorded into the memory card. In addition to image information, voice information and the like can be recorded in the memory card.

A display control section 12*c* of the signal processing/control section 12 can give the photographed image which has been signal-processed to the display section 17 and the eye piece display section 31. Note that the eye piece display section 31 is provided with a communication section 32, and an image signal from the signal processing/control section 12 is transferred to the eye piece display section 31 via the communication sections 18 and 32. The display section 17 and the eye piece display section 31 have display screens 17*b* and 31*a* of an LCD or the like, respectively, and display an image given from the signal processing/control section 12. The display control section 12*c* is adapted to be able to cause various menu displays, and the setting mode selection display 55 and parameter selection display 56 described above to be displayed on the display screens 17*b* and 31*a*.

Note that the eye piece display section 31 is provided with an eye piece sensor 33 for detecting that the user has put an eye close to the part of the eye piece display section 31 to be brought close to the eye, and the signal processing/control section 12 can judge whether or not the user has put an eye close to the part to be brought close to the eye (an eyepiece) according to a result of the detection by the eye piece sensor 33. That is, it is possible to judge which of the first display section and the second display section is used, on the basis of the result of the detection by the eye piece sensor 33.

Furthermore, the photographing apparatus body 10 is provided with the touch panel 17*a* which outputs a detection signal according to a predetermined operation. For example, by providing the touch panel 17*a* on the display screen 17*b* of the display section 17, it is possible to generate an operation signal corresponding to a position on the display screen 17*b* which the user points at with a finger. Thereby, the touch operation detection section 12*b* of the signal processing/control section 12 can detect an operation of the user touching on the display screen 17*b* of the display section 17 (an operation of pressing) and can also detect, when the user performs a slide operation of sliding a finger on the display screen 17*b* of the display section 17, a slide direction of the slide operation.

By controlling each section, the signal processing/control section 12 sets a photographing mode based on a user operation and realizes a photographing function corresponding to each photographing mode. For example, a parameter control section 12*a* of the photographing apparatus body 10 is given a result of detection by the touch operation detection section 12*b* and sets a parameter corresponding to a touch operation and a slide operation which the user has performed on the display screen 17*b* of the display section 17. For example, the parameter control section 12*a* sets respective parameters for aspect ratio, exposure, diaphragm, white balance, shutter speed, photometry, focus control and the like, according to a user's touch and slide operations.

Figure 4:
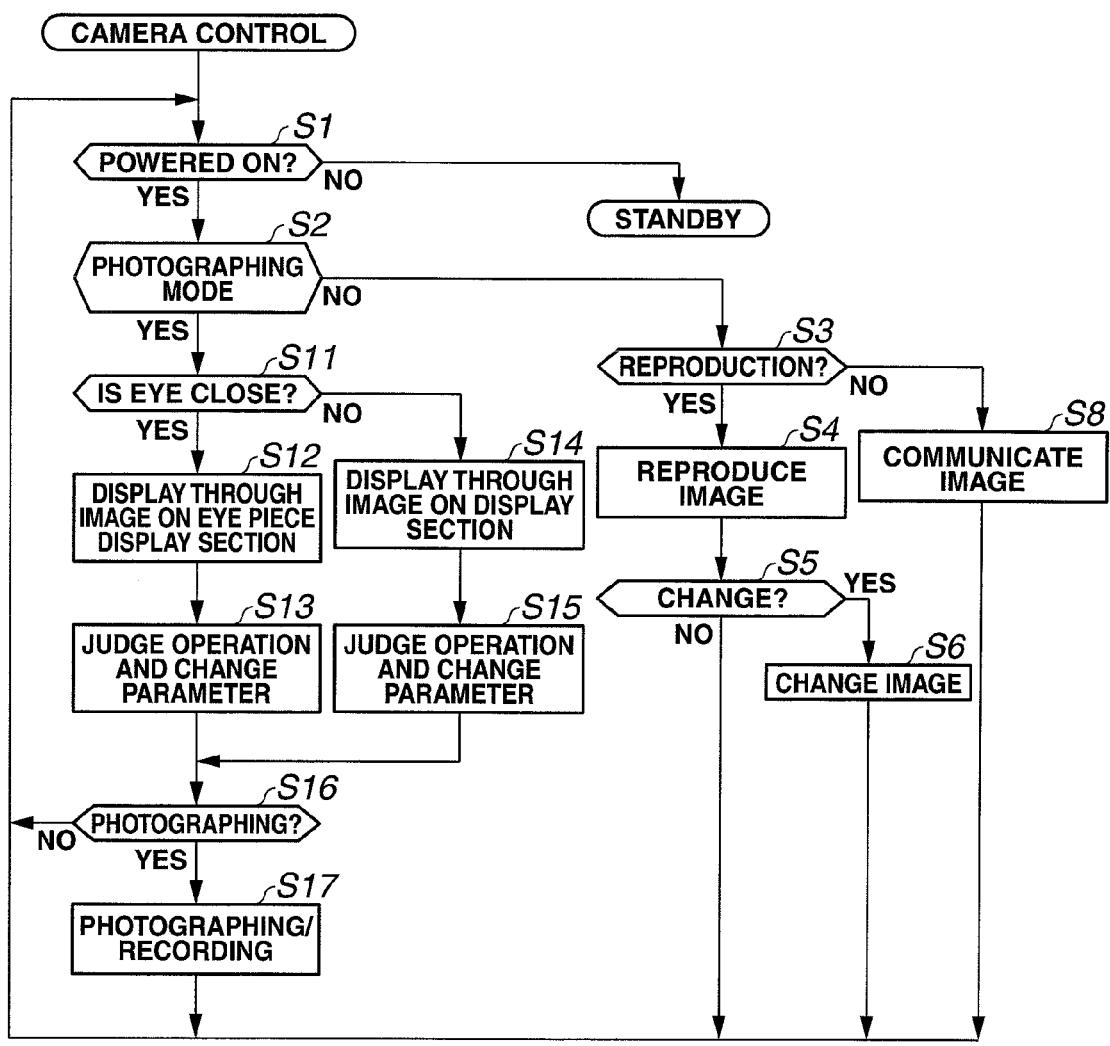
FIG. 4 is a flowchart for illustrating camera control.
Figure 5:
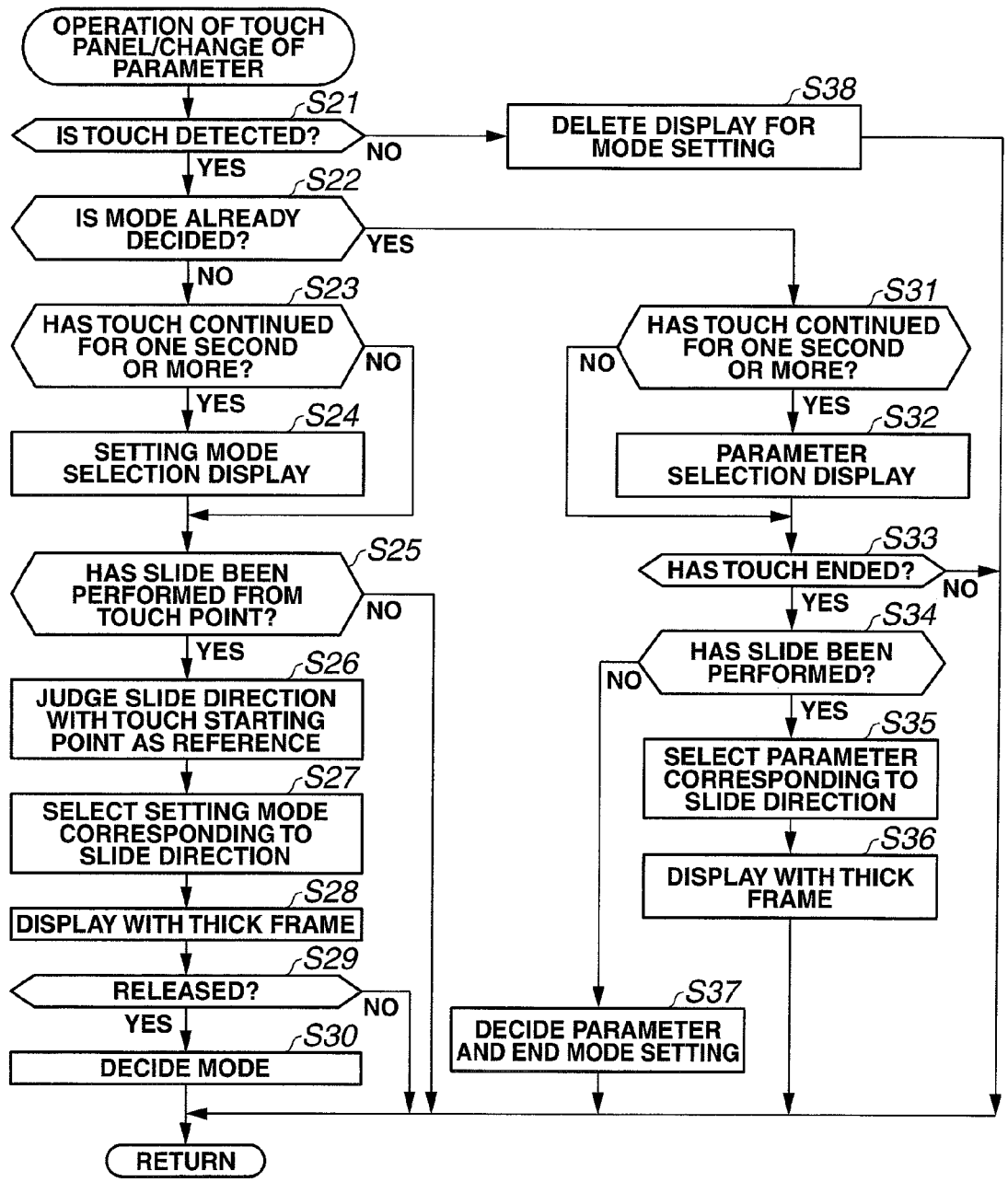
FIG. 5 is a flowchart showing a specific example of an operation judgment and parameter change step at step S13 in FIG. 4.

Next, an operation of the embodiment configured as described above will be described with reference to FIGS. 4 and 5. FIG. 4 is a flowchart for illustrating camera control, and FIG. 5 is a flowchart showing a specific example of an operation judgment and parameter change step at step S13 in FIG. 4.

At step S1 in FIG. 4, when it is detected that the photographing apparatus 1 is powered on, the signal processing/control section 12 judges whether or not the photographing mode has been specified, at a next step S2. If the photographing mode has not been specified, the signal processing/control section 12 judges whether or not a reproduction mode has been specified, at step S3. If the reproduction mode is specified, the signal processing/control section 12 performs reproduction of a selected image at step S4. When the user makes an instruction to change the image to be reproduced, the signal processing/control section 12 moves the process from step S5 to S6 and changes the image. Note that, if the reproduction mode has not been specified at step S3, the signal processing/control section 12 proceeds to an image communication mode for transmitting the photographed image, at step S8.

On the other hand, if the photographing mode is specified, the signal processing/control section 12 performs close-eye judgment at step S11. The sensor 33 for detecting that the user has put an eye close to the part of the eye piece display section 31 to be brought close to the eye is provided near the eye piece display section 31, and the signal processing/control section 12 can judge whether or not the user has put an eye close to the part to be brought close to the eye by a result of detection by the sensor 33.

If judging that the user has not put an eye close to the part to be brought close to the eye, by the close-eye judgment, the signal processing/control section 12 moves the process to step S14 and performs live view display of a picked-up image (through image) on the display section 17 on the basis of an image signal from the image pickup section 11. Furthermore, the signal processing/control section 12 judges various operations by the user at step S15 and performs various setting operations, for example, an operation of changing various parameters such as a photographing parameter, a photographing operation and the like on the basis of a judgment result. Here, since operations are performed while an object displayed on the screen is being seen, operations including a touch releasing operation to be described later with reference to FIG. 10 can be performed. That the user has touched an object is assumed to mean that the user has found an interesting object that the user has intuitively selected, and photographing is performed with focus and exposure adjusted for a touch point.

When the user puts an eye close to the part to be brought close to the eye at the time of the photographing mode, the signal processing/control section 12 moves the process from step S11 to step S12 and displays a through image on the display screen 31*a* of the eye piece display section 31. Furthermore, the signal processing/control section 12 judges an operation by the user at step S13 and changes a parameter on the basis of a judgment result.

FIG. 5 shows a specific example of the operation judgment method. Especially, a state is assumed in which it is possible to perform an operation without seeing the touch panel when the eye is put close to the part to be brought close to the eye. In this case, since an object itself is not touched, it is not necessary to assume touch release. However, there is a restriction that display on a touched part cannot be confirmed. At step S21 in FIG. 5, the touch operation detection section 12*b* of the signal processing/control section 12 detects whether or not the user has touched the touch panel 17*a* arranged on the display section 17.

Now, it is assumed that the user performs parameter setting for photographing while confirming an object by a live view display by the eye piece display section 31. In this case, the user touches the display section 17 with a finger, confirming the live view display on the eye piece display section 31. The touch is not a touch on the eye piece section.

At step S22, the signal processing/control section 12 judges whether or not the mode for setting a parameter has been already decided. If the mode has not been decided, the signal processing/control section 12 judges that an operation for selecting the mode for setting a parameter has been performed by detection of a touch by the signal processing/control section 12. If the touch continues, for example, for one second or more as a result of detection by the signal processing/control section 12, the display control section 12*c* moves the process from step S23 to step S24 and causes, for example, the setting mode selection display shown in FIG. 2D to be displayed on the display screen 17*b* of the display section 17. Here, since the touch is made without being able to perform visual confirmation, the display is shown on the basis of time period management. However, the display may be shown on the basis of a particular touch operation, tap operation or slide operation.

The signal processing/control section 12 may decide a mode through the process from steps S25 to S35 irrespective of whether or not the setting mode selection display is displayed on the display section. At step S25, the touch operation detection section 12*b* judges whether or not the position of the touching finger has changed from the touched point, that is, whether or not the user is performing a slide operation. If the user has performed a slide operation, the touch operation detection section 12*b* judges a slide direction with the touch starting point as a reference (step S26). As described above, since the touched position itself is not involved in the operation, it is possible to perform an operation without visual confirmation.

The signal processing/control section 12 selects a setting mode corresponding to the slide direction on the basis of a result of detection by the touch operation detection section 12*b* (step S27), and a display corresponding to the selected mode is displayed in a thick frame as in FIG. 3B (step S29).

When the user releases the finger from the touch panel 17*a*, the signal processing/control section 12 decides the selected mode (step S30). Until the user releases the finger, the mode decision at step S30 is not performed. Therefore, even if the user slides the finger in a wrong direction, the user can select a desired mode by sliding the finger in a right direction without releasing the finger.

When the user touches the touch panel 17*a* again in a state that the mode is decided, the signal processing/control section 12 moves the process from step S22 to step S31, and the display control section 12*c* judges whether or not the touch has continued, for example, for one second or more on the basis of a result of detection by the signal processing/control section 12 (step S31). If the touch continues for one second or more, the display control section 12*c* causes, for example, the parameter selection display shown in FIG. 3C to be displayed on the display screen 17*b* of the display section 17 (step S32). Here again, a method other than the method by time period management, such as a method by tapping, may be adopted.

The signal processing/control section 12 decides a parameter (or an amount of change) through steps S33 to S37 irrespective of whether or not the parameter selection display is displayed on the screen. At step S33, the touch operation detection section 12*b* judges whether or not the user has released the finger from the touch panel 17*a*. If the finger is released, the touch operation detection section 12*b* judges whether or not a slide is performed, at step S34. If a slide operation has been performed, the signal processing/control section 12 judges a slide direction with the touch starting point as a reference and selects a parameter corresponding to the slide direction, at a next step S35. The display control section 12*c* of the signal processing/control section 12 displays a display corresponding to the selected parameter in a thick frame (step S36).

Note that, since the parameter selection operation is performed until the finger is released from the touch panel 17*a*, the user can select a desired parameter by sliding the finger in a right direction without releasing the finger even if he/she slides the finger in a wrong direction.

In order to decide the selected parameter, the user touches the touch panel 17*a* again and releases the finger from the touch panel 17*a* without sliding the finger. Thereby, the process moves from step S34 to step S37, and the parameter control section 12*a* decides the selected parameter. The decided parameter is recorded in the nonvolatile memory (recording section) as a control parameter. The signal processing/control section 12 controls each section according to the decided parameter and ends the mode setting.

Note that the decision of a parameter is performed by touching the touch panel 17*a* with a finger and releasing the finger without sliding it. In this case, it is conceivable that the user repeats a slide operation multiple times while the parameter selection display is displayed. In this case, a parameter may be decided on the basis of the last slide operation performed by the user. Otherwise, the amount of change in parameter specified by each slide operation is integrated to set an integrated value as a set value of the parameter. Such addition of parameters by repetition can be said to be an intuitive operation. It is because the number of operations is converted to change in a parameter.

The above operation is summarized as below.

A parameter (exposure compensation) corresponds to the "upper-level item", and a value (an amount of change) to be set for the parameter corresponds to the "item". That is, at the time of selecting an amount of change ("item"), the selection screen (FIG. 3C) is displayed. When selection of an amount of change ("item") ends, the decision screen (FIG. 3D) is displayed to set the selected amount of change ("item") for the parameter (to decide the amount of change ("item") as the parameter).

Note that, if a touch is not detected at step S21, the signal processing/control section 12 deletes the display for mode setting shown in FIGS. 2A to 2D and FIGS. 3A to 3D to return to the state of displaying only a through image, after elapse of a predetermined time period.

When the parameter is set, the signal processing/control section 12 judges whether or not a photographing operation has been performed, at step S16 in FIG. 4 next. If the user operates the shutter button 35 and performs photographing, the signal processing/control section 12 performs photographing at step S17. The signal processing/control section 12 performs predetermined signal processing for a picked-up image from the image pickup section 11 to generate a picked-up image. The signal processing/control section 12 gives the generated picked-up image to the recording section 16 and converts it to an image file.

As described above, in the present embodiment, setting operations for mode setting, photographing parameter setting and the like can be performed by touch and slide operations. In this case, not a touch position but only a slide direction is used to decide a mode and a parameter, and the user does not have to confirm a position to touch by looking at a display screen. Therefore, it is possible to easily perform a setting operation even during photographing. For example, it is possible to certainly perform parameter setting and the like by performing a slide operation on the panel on the back surface in a state of looking in the display screen in the eye piece display section, and it is possible to enhance intuitiveness, responsiveness and operability. Furthermore, by making it possible to change a numerical value by repeating the same slide operation or changing a slide distance, it is possible to perform an intuitive, speedy and flexible operation. A problem is eliminated that there is some position a finger cannot reach, and a necessary operation can be easily performed by an operation with a short thumb with fewer joints and a lower degree of freedom. Therefore, the camera can be kept being held without necessity of changing the way of holding it, and unintentional movement of hands can be suppressed.

Since an operation can be performed in a state of looking in the display screen of the eye piece display section, it is possible to perform framing more easily, reduce unintentional movement at the time of photographing at a long focal length and hold a camera more stably than in the case of releasing an eye from the eye piece display section. Furthermore, since the display screen is not influenced by sunlight, it is possible to certainly observe an object in a state of the object being easily viewed with superior color reproducibility. Thereby, it is possible to certainly confirm a composition or setting of a parameter, and the user does not miss the very best moment for taking a picture.

In the photographing apparatus 1 described above, the touch panel 17*a* is arranged on the display section 17. However, the position of arrangement of the touch panel is not limited to be on the display section 17. The touch panel may be arranged at any position on the photographing apparatus 1 if it is possible to perform an operation using the eye piece display section 31. The display section 17, which is the second display section, is not necessarily required. The present invention can be applied to a photographing apparatus 1 without the display section 17.

(Second Embodiment)

Figure 7B:
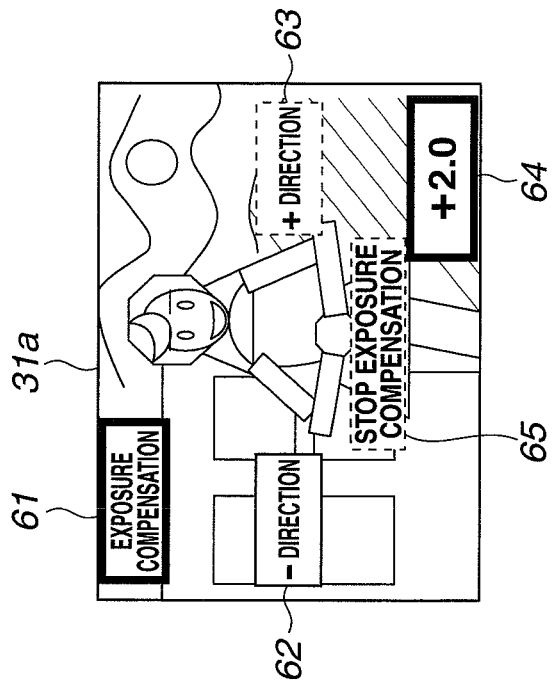
FIGS. 7A and 7B are diagrams for illustrating the second embodiment.
Figure 7A:
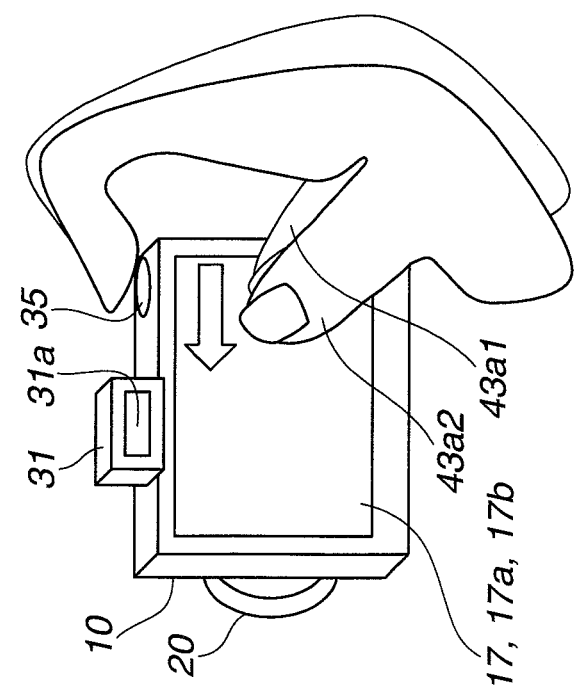

FIG. 6 is a flowchart showing an operation flow adopted in a second embodiment of the present invention. In FIG. 6, the same procedure steps as in FIG. 5 are given the same reference numerals, and description thereof will be omitted. FIGS. 7A and 7B are diagrams for illustrating the second embodiment. A hardware configuration in the present embodiment is similar to that in the first embodiment.

The present embodiment is different from the first embodiment only in the way of selecting and deciding a parameter. FIG. 7B is a diagram showing an example of a parameter selection display in the second embodiment. As shown in FIG. 7B, on the display screen 31*a* of the eye piece display section 31, a display 61 showing that the exposure compensation mode is selected, a display 62 showing that the amount of change in parameter is decreased by a predetermined amount, a display 63 showing that the amount of change in parameter is increased by a predetermined amount, a display 64 showing that the current amount of change in parameter is +2.0, and a display 65 indicating a return direction are displayed on a live view display.

At step S41 in FIG. 6, the touch operation detection section 12*b* of the signal processing/control section 12 judges whether or not a slide operation has been performed in a preset return direction. The return direction is a slide direction for ending the current setting mode. In the example of FIG. 7B, the return direction is a straight downward direction shown by the display 65.

If the operation is not an operation in the return direction, the touch operation detection section 12*b* judges whether or not the operation is an operation in a numerical value decision direction, at a next step S42. If judging that the operation is the operation in the numerical value decision direction, the signal processing/control section 12 increases or decreases the amount of change in parameter by 1 step (a predetermined amount of change) each time the slide operation is performed (step S43).

For example, as shown in FIG. 7A, if the user slides the thumb from a thumb 43a1 at a starting point position to a thumb 43a2 at an ending point position on the display screen 17b of the display section 17 in a left direction indicated by an arrow, the signal processing/control section 12 decreases the amount of change in parameter by the predetermined amount. On the contrary, if the user slides a finger in a right direction, the signal processing/control section 12 increases the amount of change in parameter by the predetermined amount. The display control section 12c displays the current amount of change in parameter as the display 64.

In this way, in response to an operation of the user sliding a finger in the right or left direction, the amount of change in parameter increases or decreases. If judging that the slide direction is the return direction, the signal processing/control section 12 moves the process to step S44 and decides the current numerical value as the amount of increase/decrease in parameter.

The signal processing/control section 12 sets various parameters such as aspect ratio, exposure, diaphragm, white balance, shutter speed, photometry, focus control and the like in accordance with the amount of change in parameter based on the user operation.

As described above, in the present embodiment also, advantages similar to those of the first embodiment can be obtained. In the present embodiment, it is sufficient to perform only operations in two directions for increasing and decreasing a parameter, and there is an advantage that an operation is much simpler. It goes without saying that the features and advantages described in the first embodiment are obtained though description thereof is not repeated.

(Third Embodiment)

Figure 8:
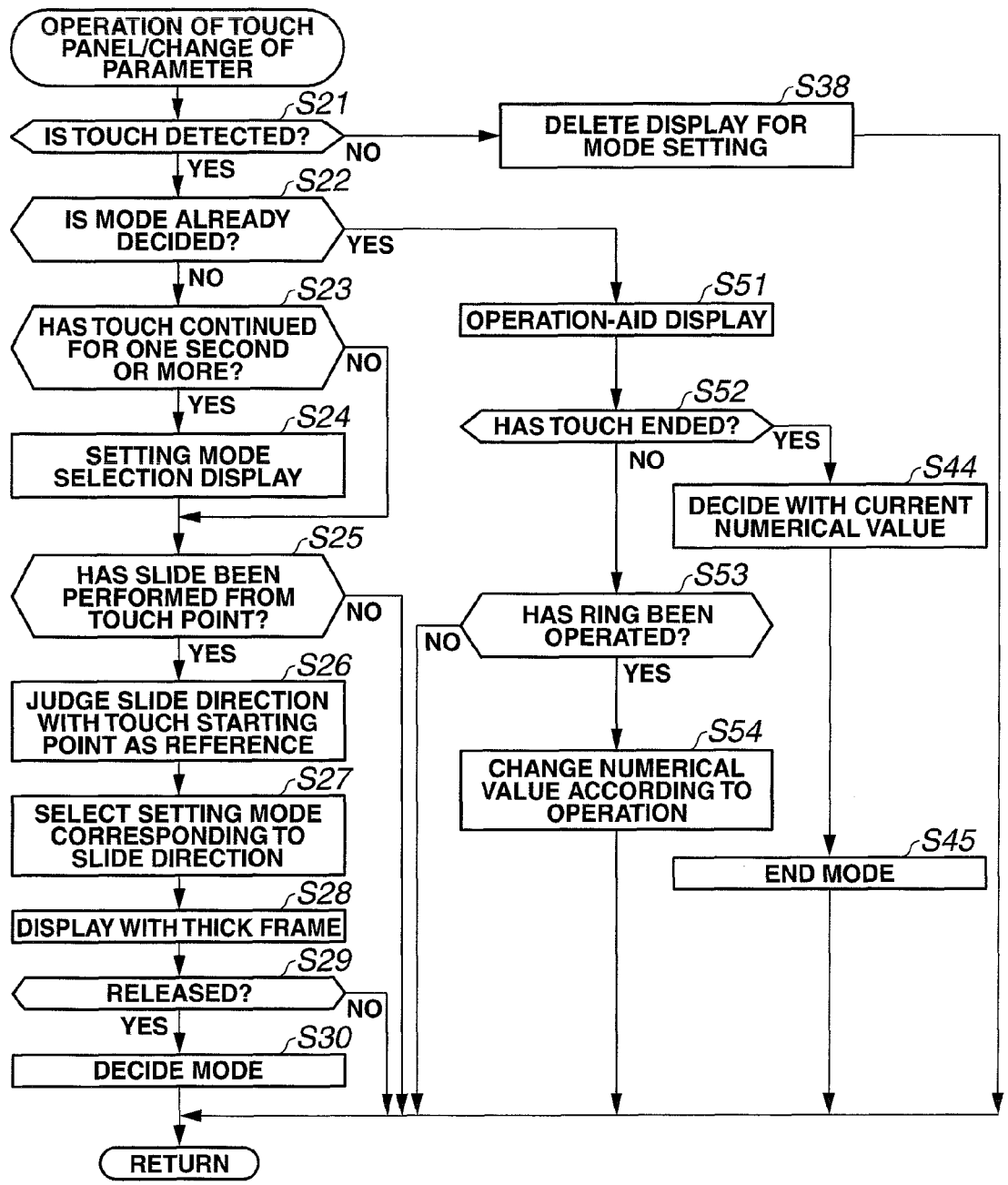
FIG. 8 is a flowchart showing an operation flow adopted in a third embodiment of the present invention.
Figure 9B:
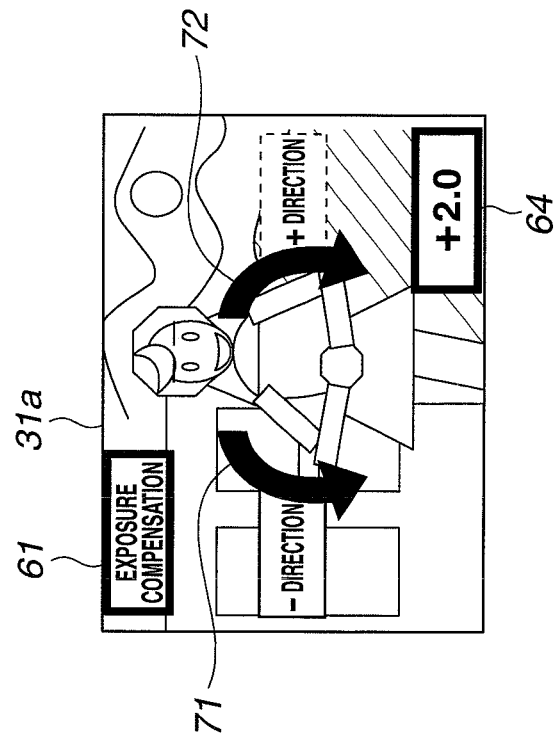
FIGS. 9A and 9B are diagrams for illustrating the third embodiment.
Figure 9A:
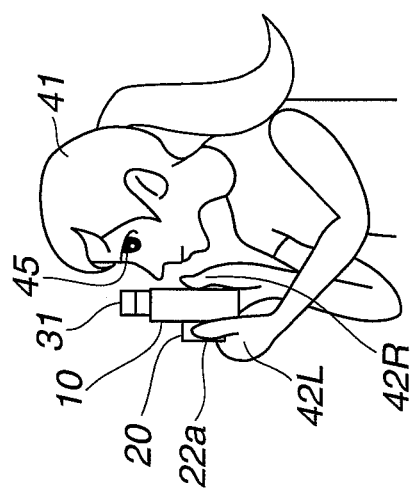

FIG. 8 is a flowchart showing an operation flow adopted in a third embodiment of the present invention. In FIG. 8, the same procedure steps as in FIG. 6 are given the same reference numerals, and description thereof will be omitted. FIGS. 9A and 9B are diagrams for illustrating the third embodiment. A hardware configuration in the present embodiment is similar to that in the first embodiment.

The present embodiment is different from the second embodiment only in the way of selecting and deciding a parameter. In the present embodiment, the signal processing/control section 12 is given information about a ring operation of the ring operation section 22a from the interchangeable lens 20 and changes the amount of change in parameter according to the ring operation.

FIG. 9B is a diagram showing an example of a parameter selection display in the third embodiment. As shown in FIG. 9B, on the display screen 31a of the eye piece display section 31, a display 61 showing that the exposure compensation mode is selected, an operation aid display 71 showing a rotation direction for decreasing the amount of change in parameter (−direction) by a predetermined amount, an operation aid display 72 showing a rotation direction for increasing the amount of change in parameter (+direction) by the predetermined amount, and a display 64 showing that the current amount of change in parameter is +2.0 are displayed on a live view display.

At step S51 in FIG. 8, the display control section 12c of the signal processing/control section 12 displays the operation aid displays 71 and 72. Next, at step S52, the signal processing/control section 12 judges whether or not a finger has been released from the touch panel 17a. If the finger is released, the signal processing/control section 12 ends the parameter increase/decrease operation and moves the process to step S44. In the present embodiment, the parameter increase/decrease operation by the ring operation section 22a is accepted during a period during which the user keeps the finger touching.

The user rotates the ring operation section 22a in a clockwise or counterclockwise direction in order to decide an amount of increase/decrease in parameter. The signal processing/control section 12 judges whether or not a ring operation has been operated, at step S53, and changes a parameter according to the operation (step S54). The signal processing/control section 12 increases the parameter when the user rotates the ring operation section 22a in the clockwise direction, and decreases the parameter when the user rotates the ring operation section 22a in the counterclockwise direction.

In this case, the signal processing/control section 12 sets a value corresponding to the amount of rotation of the ring operation section 22a as the amount of increase/decrease in parameter. The display control section 12c displays the current amount of change in parameter as the display 63.

Other components and operation are similar to those of the second embodiment.

As described above, in the present embodiment also, advantages similar to those of the first embodiment can be obtained. In the present embodiment, a parameter can be increased or decreased by a simple operation by the ring operation section. There is an advantage that, in a state of being able to use right and left hands at the same time, the operability is further improved.

In each of the embodiments described above, the description has been made on the assumption that a finger touching the touch panel can be slid in all directions. However, there may be a case that the finger cannot be necessarily slid in all directions, for example, as in the case of touching an end part of a screen first. In this case, a display may be displayed which shows that it is not possible to select a mode or parameter corresponding to a direction in which sliding is impossible. For example, as such a display, a display is conceivable in which the color or shade of an appropriate part on the setting mode selection display and the parameter selection display is shown different from other parts. In this case, the user can select all the modes and parameters by touching again a position where sliding in all direction is possible. It goes without saying that the features and advantages described in the first embodiment are obtained though description thereof is not repeated. In a state in which a lens section has an operation member and both hands can be used, it is possible to perform an operation with a higher degree of freedom without unintentional movement of hands or interruption of framing, including an operation of the lens section which has to be grasped at the time of framing. Furthermore, it is possible to adopt an operation which the user intuitively wants to do, such as a touch release, without inconsistency and it is possible to provide a camera which satisfies the user sufficiently.

(Fourth Embodiment)

Figure 10:
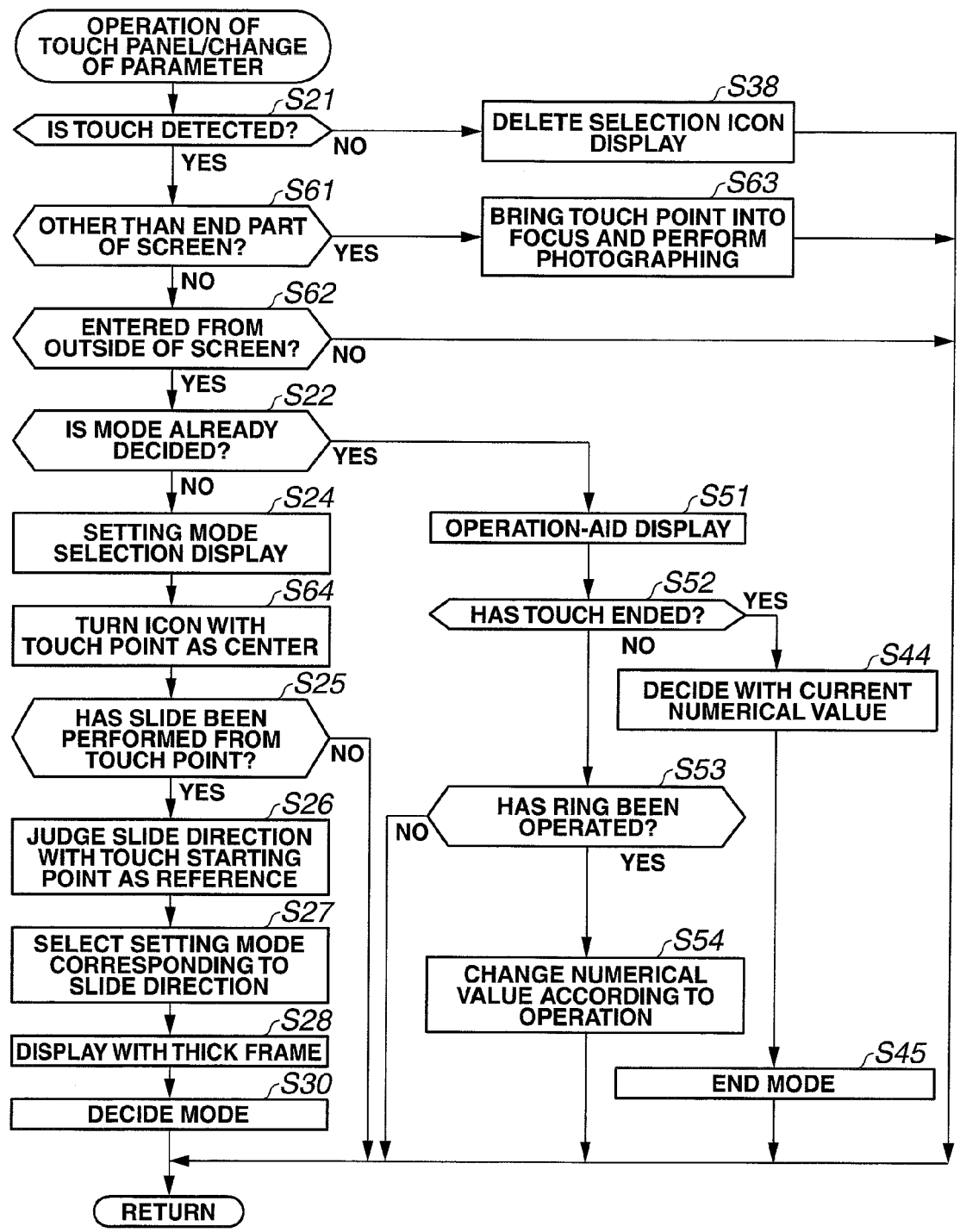
FIG. 10 is a flowchart showing an operation flow adopted in a fourth embodiment of the present invention.

FIG. 10 is a flowchart showing an operation flow adopted in a fourth embodiment of the present invention. In FIG. 10, the same procedure steps as in FIG. 8 are given the same reference numerals, and description thereof will be omitted. FIGS. 11A to 11E are diagrams for illustrating the fourth embodiment. A hardware configuration in the present embodiment is similar to that in the first embodiment.

In the photographing apparatus 1, not only an operation of pressing the shutter button 35 but also a touch operation on the display screen 17b of the display section 17 is an operation for performing photographing and recording. The signal processing/control section 12 has a function of, when the user touches a display part of an object to be brought into focus, on a display of a picked-up image displayed on the display section 17 (a live view display), causing the object to be brought into focus, and acquiring and recording the picked-up image (hereinafter referred to as a touch photographing function).

The present embodiment makes it possible to, in a photographing apparatus having the touch photographing function also, set a photographing parameter when a live view display is displayed by operating the touch panel 17*a*.

FIG. 10 is a flowchart showing an example of a procedure for selection of a setting mode and selection of a parameter in the present embodiment. The procedure can be adopted, for example, as step S15 in FIG. 4.

Figure 11A:
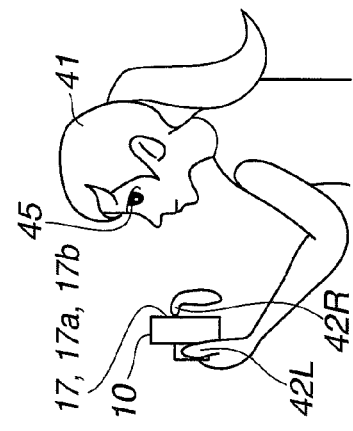
FIGS. 11A to 11E are diagrams for illustrating the fourth embodiment

When the eye piece display section 31 is removed from the photographing apparatus 1 or when the user releases an eye from the eye piece display section 31 at the time of the photographing mode, a live view display may be displayed on the display screen 17*b* of the display section 17. FIG. 11A shows such a photographing state. The user 41 releases an eye 45 from the photographing apparatus body 10, supports the photographing apparatus body 10 with the left hand 42L and operates the display screen 17*b* arranged on the display section 17 with the right hand to perform setting of a photographing parameter and a photographing operation.

The signal processing/control section 12 has the touch photographing function, and it is necessary to identify whether an operation on the touch panel 17*a* is an operation of setting a photographing parameter or a photographing operation. Therefore, in the present embodiment, it is judged at step S61 whether or not a user's finger has touched a part other then an end part of the screen.

Figure 11B:
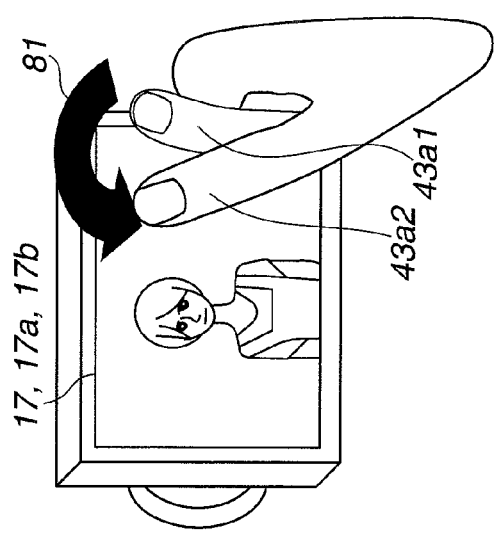

In the case of setting a photographing parameter or the like, the user slides a finger from the outside of the screen into the screen. FIG. 11B shows the slide operation. The user slides the thumb from a thumb 43*a*1 at a starting point position to a thumb 43*a*2 at an ending point position in a direction from an end part of the display screen 17*b* of the display section 17 toward the central side shown by an arrow 81. In this case, the user's finger comes in contact with the touch panel 17*a* at the end part of the screen first. If judging that the user's touch operation is performed on a part other than the end part of the screen, at step S61, the touch operation detection section 12*b* of the signal processing/control section 12 brings the touch point into focus and then performs photographing at step S63. Since an object of interest is generally displayed on the central side of a screen, photographing can be performed at step S63 by touching the object of interest.

If judging that the user has touched an end part of the screen, the touch operation detection section 12*b* judges whether or not the finger has slid from the end part of the screen to the central part side of the screen, that is, whether or not an operation of causing the finger to enter the screen from the outside of the screen has been performed, at a next step S62. When the slide operation shown in FIG. 11B is performed, the signal processing/control section 12 moves the process to step S22 and judges whether or not a mode has been already decided.

Figure 11C:
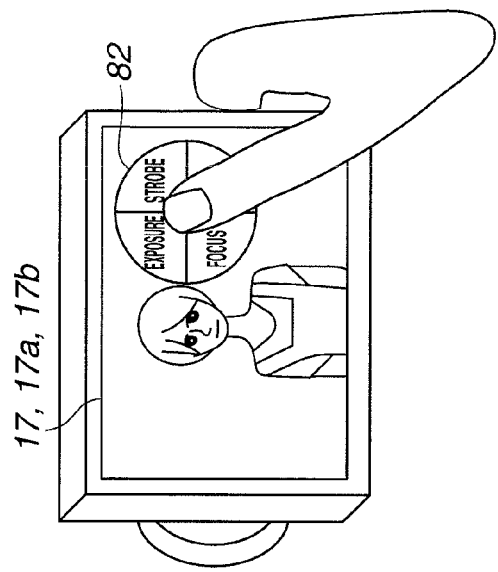
Figure 11D:
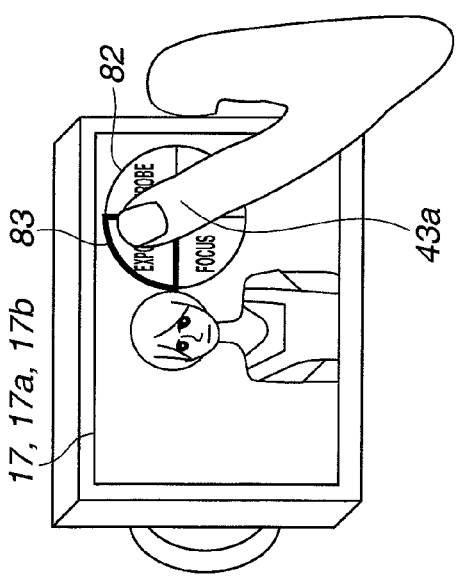
Figure 11E:
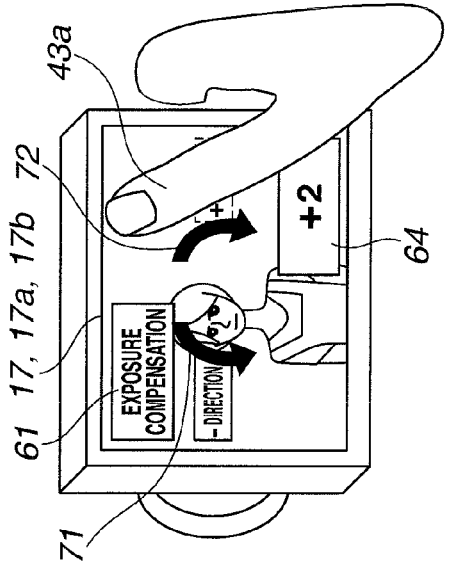

If a mode has not been decided yet, the display control section 12*c* of the signal processing/control section 12 displays a setting mode selection display, for example, at a position the finger touches. FIG. 11C shows a state in which a setting mode selection display 82 is displayed in a through image display on the display screen 17*b*. FIG. 11C shows an example of selecting a mode by one of four icons obtained by dividing the setting mode selection display 82 into four. Three of the four icons show that they are for selecting modes of "EXPOSURE", "STROBE" and "FOCUS", respectively.

The display control section 12*c* turns the respective icons with the center of the setting mode selection display 82 as an axis so that the user can visually confirm the icon hidden under the finger (step S64).

Through steps S25 to S27, the touch operation detection section 12*b* detects a setting mode corresponding to an icon selected on the basis of in which icon direction the user has slid the finger. The display control section 12*c* surrounds the icon on the setting mode selection display 82 with a thick frame display 83 (FIG. 11D) (step S28). In the present embodiment, the signal processing/control section 12 decides the selected setting mode as a mode to be used, at step S30.

An operation performed after the decision of the mode is similar to that in the embodiment in FIG. 8. During a period during which the user causes the finger 43*a* to touch the touch panel 17*a*, a ring operation by the ring operation section 22*a* is accepted (see FIG. 11E). The signal processing/control section 12 increases the parameter when the user rotates the ring operation section 22*a* in the clockwise direction, and decreases the parameter when the user rotates the ring operation section 22*a* in the counterclockwise direction. The signal processing/control section 12 sets a value corresponding to the amount of rotation of the ring operation section 22*a* as the amount of the parameter. The display control section 12*c* displays the current amount of change in parameter as the display 64.

Other components and operation are similar to those of the third embodiment.

As described above, in the present embodiment, it is possible to set a photographing parameter and the like only by touch and slide operations in a photographing apparatus having the function of performing a photographing operation by touching a display screen. If it is enabled to change a numerical value by repeating the same slide operation or changing a slide distance, it is possible to perform an intuitive, speedy and flexible operation. A problem is eliminated that a finger cannot reach some position of a touch member, and a necessary operation can be performed easily, simply and quickly by performing an operation with a thumb. Therefore, the camera can be kept being held without necessity of changing the way of holding it, and unintentional movement of hands can be suppressed. To repeat redundant description, it is possible to adopt an operation which the user intuitively wants to do, such as a touch release, without inconsistency and it is possible to provide a camera which satisfies the user sufficiently. Of course, since the operation is performed while the screen is being seen, the operation may be performed with a forefinger. In this case also, since it is not necessary to touch a limited definite point, a quick and intuitive operation without a malfunction is possible.

Furthermore, in each of the embodiments of the present invention, description has been made with a digital camera as an apparatus for photographing. However, a digital single-lens reflex camera or a compact digital camera may be used as the camera, and a camera for motion picture, such as a video camera and a movie camera, may also be used. Furthermore, a camera included in a mobile information terminal (PDA: personal digital assistant), such as a mobile phone and a smartphone, may be used, of course.

Furthermore, the present invention is applicable to electronic apparatuses having a display section on which a touch panel is arranged, for example, a monitor for computer, a multifunction TV (a smart TV, a connected TV, a hybrid TV) and the like.

The present invention is not immediately limited to each of the embodiments described above. At the stage of practice, the present invention can be embodied by modifying components within a range not departing from the spirit thereof. Furthermore, various inventions can be formed by appropriately combining the multiple components disclosed in each of the embodiments described above. For example, some of all the components shown in the embodiments may be eliminated. Furthermore, components in different embodiments may be appropriately combined.

Even when description is made with the use of "first", "next" and the like for convenience with regard to an operation flow in the claims, the specification and the drawings, it does not mean that the flow is necessarily to be implemented in that order. Furthermore, it goes without saying that each of steps constituting such an operation flow may be appropriately omitted if the step is a part that does not influence the essence of the invention.

What is claimed is:

1. A photographing apparatus comprising:
   an image pickup section picking up an object image to acquire a picked-up image;
   a display section capable of showing a display based on the picked-up image;
   a touch panel generating a signal corresponding to a predetermined operation; and
   a control section detecting a direction of a slide operation on the touch panel and performing control to select one of multiple items displayed on the display section on the basis of the direction of the slide operation; wherein
   the control section sets a display position of each of the multiple items to correspond to an operation direction for selecting the item on a one to one basis and selects one of the multiple items corresponding to the direction of the slide operation irrespective of a position of a starting point of touch on the touch panel by the slide operation, in the selection.

2. The photographing apparatus according to claim 1, wherein the control section combines the display based on the picked-up image with the display for changing a photographing parameter and displays the combination on the display section.

3. The photographing apparatus according to claim 1, wherein the display section is of an eye piece type.

4. The photographing apparatus according to claim 2, wherein the display section is of an eye piece type.

5. The photographing apparatus according to claim 3, wherein the touch panel is provided on a display screen of another display section different from the display section.

6. The photographing apparatus according to claim 4, wherein the touch panel is provided on a display screen of another display section different from the display section.

7. The photographing apparatus according to claim 1, wherein the touch panel is provided on a display screen of the display section.

8. The photographing apparatus according to claim 2, wherein the touch panel is provided on a display screen of the display section.

9. The photographing apparatus according to claim 1, wherein
   the control section displays a setting mode selection display and a parameter selection display for each setting mode as displays for changing a photographing parameter; and
   the control section causes the setting mode selection display to be displayed in response to a touch operation on the touch panel and performs selection of a setting mode, display of the parameter selection display corresponding to the selected setting mode and selection of a parameter on the basis of a result of the detection of the slide direction.

10. An operation control method for a photographing apparatus, the photographing apparatus comprising: an image pickup section picking up an object image to acquire a picked-up image; a display section capable of showing a display based on the picked-up image; a touch panel generating a signal corresponding to a predetermined operation; and a control section, the method comprising:
    setting a display position of each of the multiple items displayed on the display section to correspond to an operation direction for selecting the item on a one to one basis by the control section;
    detecting a direction of a slide operation on the touch panel by the control section; and
    selecting, on the basis of the detected slide operation direction and irrespective of a position of a starting point of touch on the touch panel by the slide operation, one of the multiple items corresponding to the slide operation direction, by the control section.

11. A photographing apparatus comprising:
    an image pickup section picking up an object image to acquire a picked-up image;
    a display section capable of showing a display based on the picked-up image;
    a touch panel generating a signal corresponding to a predetermined operation; and
    a control section detecting a direction of a slide operation on the touch panel and performing control to select one of multiple items displayed on the display section on the basis of the direction of the slide operation; wherein
    the control section sets a display position of each of the multiple items to correspond to an operation direction for selecting the item on a one to one basis and selects one of the multiple items corresponding to the direction of the slide operation such that the starting point of the slide operation may be at any point on the touch panel, in the selection.

* * * * *